UNITED STATES PATENT OFFICE.

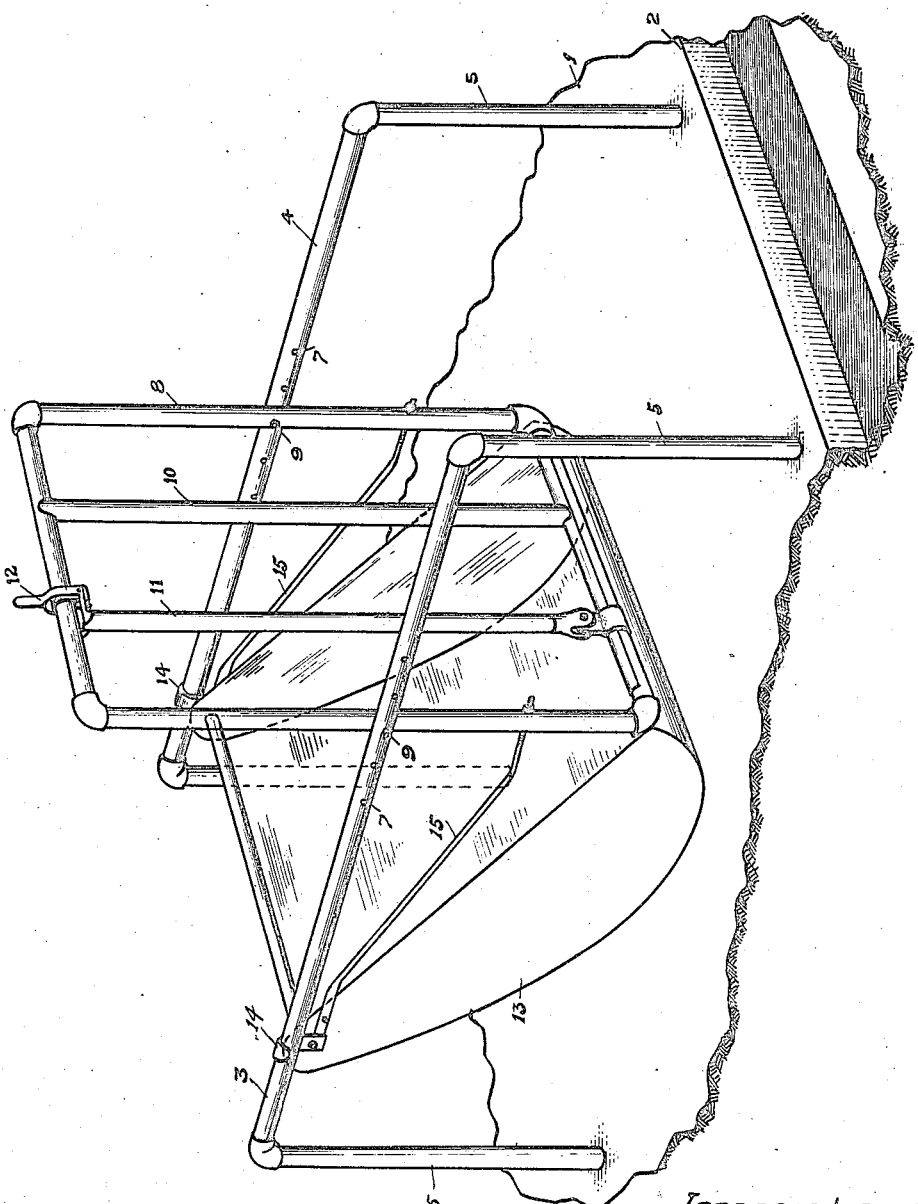

EDWARD HOPKINS MOFFATT AND WILLIAM HENRY MOFFATT, OF TORONTO, ONTARIO, CANADA.

STALL.

1,427,224.  Specification of Letters Patent.  Patented Aug. 29, 1922.

Application filed October 24, 1921. Serial No. 510,041.

*To all whom it may concern:*

Be it known that we, EDWARD HOPKINS MOFFATT and WILLIAM HENRY MOFFATT, subjects of the King of Great Britain, and residents of 46 Colborne Street, city of Toronto, county of York, Province of Ontario, Dominion of Canada, have invented certain new and useful Improvements in Stalls, of which the following is a description.

The invention relates to improvements in stalls as described in the present specifications and shown in the accompanying drawings that form a part of the same.

The invention consists essentially of the novel features of construction whereby the manger and stanchion are adjustable in relation to the draining element.

The objects of the invention are to insure the proper positioning of the animal in relation to the draining element regardless of the length of said animal, thus providing a clean and sanitary stall, to reduce to a minimum the cost of upkeep of buildings adapted to house animals, and generally to provide a form of stall which will be inexpensive of construction, simple of adjustment, practical, and durable.

The drawing is a perspective view of a stall.

Referring to the drawing 1 represents the flooring in which is positioned the drain trough 2 which may be of any known type.

3 and 4 represent the sides of the stall which are preferably constructed of horizontally arranged parallel bars supported at each end by uprights 5, said bars being spaced a distance to readily accommodate a cow or other animal and being provided throughout a portion of their length with oppositely disposed bolt openings 7.

8 is the stanchion adapted to be pivotally supported between the bars 3 and 4 by means of pins 9 extending through openings in the uprights of the frame of the stanchion and into or through opposing openings 7 in the bars 3 and 4, said stanchion being provided with adjustable head securing means of any desired form, as the construction of said head securing means does not form a part of the present invention, although shown in the drawings for purposes of illustration as consisting of a stationery upright 10 and an adjustable upright 11 provided with suitable locking means 12.

13 is the manger provided at its top end with laterally projecting hooks 14 from opposite sides thereof adapted to slidably engage the bars 3 and 4 respectively, said manger at its lower end being secured in any desired manner to the stanchion frame.

15 are brace rods connecting opposite sides of the manger with the corresponding uprights of the stanchion.

In the use of this invention the cow or other animal is positioned in the stall just in advance of the drain 2 and the stanchion is then adjusted longitudinally in respect to the bars 3 and 4, to bring it into proper position for securing over the head of the animal, by simply removing the pins 9 and drawing the stanchion in the required direction and inserting the pins through the openings in said bars and said stanchion. As the stanchion is moved along the bars 3 and 4 coincident movement is of course imparted to the manger 13 owing to the connection between the two elements, the hook connection between the manger and the bars 3 and 4 permitting of said manger sliding freely along said bars.

It will have been apparent that by this construction proper adjustment of the animal in relation to the drain may be effected quickly and accurately without the necessity of adjusting the stanchion and the feed box separately.

What we claim is:

1. A stall comprising side members, a stanchion pivotally supported by said side members and adjustable in longitudinal relation thereto, and a manger secured at one end to the lower end of said stanchion and at its other being provided with lateral extensions slidable along said side members.

2. A stall comprising parallel horizontal side members, a stanchion supported in vertical position between said sides and adjustable longitudinally thereof and a feed box secured at one end to said stanchion and at its other end having projections slidable along said side members.

Signed at Toronto, Ont., this twenty-third day of September, 1921.

EDWARD HOPKINS MOFFATT.
WILLIAM HENRY MOFFATT.

Witnesses:
W. G. HAMMOND,
F. BRONELEY.